US009155109B2

(12) United States Patent
Ghosh et al.

(10) Patent No.: US 9,155,109 B2
(45) Date of Patent: Oct. 6, 2015

(54) METHOD, APPARATUS, AND COMPUTER PROGRAM PRODUCT FOR CONTENTION-FREE MEDIUM ACCESS WITHIN ASSIGNED ACCESS SLOTS

(71) Applicant: Nokia Corporation, Espoo (FI)

(72) Inventors: Chittabrata' Ghosh, Fremont, CA (US); Klaus Franz Doppler, Albany, CA (US)

(73) Assignee: Nokia Technologies OY, Espoo (FI)

( * ) Notice: Subject to any disclaimer, the term of this patent is extended or adjusted under 35 U.S.C. 154(b) by 142 days.

(21) Appl. No.: 13/788,818

(22) Filed: Mar. 7, 2013

(65) Prior Publication Data
US 2014/0254497 A1    Sep. 11, 2014

(51) Int. Cl.
*H04L 5/00* (2006.01)
*H04W 72/00* (2009.01)
*H04W 74/04* (2009.01)
*H04W 74/02* (2009.01)

(52) U.S. Cl.
CPC .............. *H04W 74/04* (2013.01); *H04W 74/02* (2013.01)

(58) Field of Classification Search
USPC ................... 370/329, 255, 235, 229
See application file for complete search history.

(56) References Cited

U.S. PATENT DOCUMENTS

2010/0254333 A1*   10/2010   Shin et al. ............. 370/329
2014/0071900 A1*    3/2014   Park ..................... 370/329
2014/0169290 A1*    6/2014   Seok .................... 370/329

* cited by examiner

*Primary Examiner* — Edan Orgad
*Assistant Examiner* — Sithu Ko
(74) *Attorney, Agent, or Firm* — Locke Lord LLP

(57) ABSTRACT

Method, apparatus, and computer program product embodiments of the invention are disclosed for contention-free medium access within assigned access slots employable, for example, in connection with wireless networks. In an example embodiment of the invention, a method comprises: receiving, at an apparatus, one or more access node broadcast frames, wherein said broadcast frames comprise: assignment information on assignment of one or more assigned access slots; and contention indication indicating whether contention is to be performed in order to access said slots; learning at the apparatus, by considering said assignment information, of a slot, of said assigned access slots, assigned to the apparatus; learning, at the apparatus, by considering said contention indication, whether contention is to be performed in order to access the slot assigned to the apparatus; and accessing, at the apparatus, a medium during the slot assigned to the apparatus.

22 Claims, 11 Drawing Sheets

METHOD, APPARATUS, AND COMPUTER PROGRAM PRODUCT FOR CONTENTION-FREE MEDIUM ACCESS WITHIN ASSIGNED ACCESS SLOTS

FIELD

The field of the invention relates to contention-free medium access within assigned access slots employable, for example, in connection with wireless networks.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth is an example of a short-range wireless technology quickly gaining acceptance in the marketplace. In addition to Bluetooth other popular short-range communication technologies include Bluetooth Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

SUMMARY

Method, apparatus, and computer program product embodiments of the invention are disclosed for contention-free medium access within assigned access slots employable, for example, in connection with wireless networks.

In an example embodiment of the invention, a method comprises:
 receiving, at an apparatus, one or more access node broadcast frames, wherein said broadcast frames comprise:
  assignment information on assignment of one or more restricted access window slots, wherein at least one of said slots is single-apparatus-assigned; and
  contention indication indicating whether contention is to be performed in order to access said slots;
 learning at the apparatus, by considering said assignment information, of a slot, of said restricted access window slots, assigned to the apparatus;
 learning, at the apparatus, by considering said contention indication, whether contention is to be performed in order to access the slot assigned to the apparatus; and
 accessing, at the apparatus, a medium during the slot assigned to the apparatus, wherein said access is in accordance with said contention learning.

In an example embodiment of the invention, the method further comprises wherein the assignment information is received via a beacon frame.

In an example embodiment of the invention, the method further comprises wherein the contention information is received via at least one of a beacon frame and a resource allocation frame.

In an example embodiment of the invention, the method further comprises wherein said contention indication indicates that contention need not be performed in order to access the medium during the slot assigned to the apparatus.

In an example embodiment of the invention, the method further comprises contending, by the apparatus, during the slot assigned to the apparatus, wherein said contention indication indicates that contention is to be performed in order to access the medium during the slot assigned to the apparatus.

In an example embodiment of the invention, a method comprises:
 selecting, at an access node, one or more apparatuses to have contention-free access to a medium;
 assigning, at the access node, association identifiers to said apparatuses;
 creating, at the access node, assignment information, wherein the assignment information conveys for one or more of said apparatuses restricted access window slot assignments, wherein the assignments are specified in terms of said association identifiers, and wherein at least one of said assignments is a single-apparatus-assignment;
 setting, at the access node, contention indication indicating that contention need not be performed in order to access the medium during an assigned slot; and
 determining to transmit via one or more broadcast frames, from the access node, the assignment information and the contention indication.

In an example embodiment of the invention, the method further comprises wherein the assignment information is transmitted via a beacon frame.

In an example embodiment of the invention, the method further comprises wherein the contention information is transmitted via at least one of a beacon frame and a resource allocation frame.

In an example embodiment of the invention, the method further comprises wherein one or more of the selected apparatuses are energy-constrained.

In an example embodiment of the invention, the method further comprises wherein one or more of the selected apparatuses are of high priority.

In an example embodiment of the invention, the method further comprises setting, by the access node, cross slot boundary indication indicating, for said apparatuses selected to have contention-free access, that slot boundary crossing is disallowed.

In an example embodiment of the invention, an apparatus comprises:
 at least one processor; and at least one memory including computer program code, the at least one memory and the computer program code configured to, with the at least one processor, cause the apparatus at least to perform:

receive, at the apparatus, one or more access node broadcast frames, wherein said broadcast frames comprise:

assignment information on assignment of one or more restricted access window slots, wherein at least one of said slots is single-apparatus-assigned; and contention indication indicating whether contention is to be performed in order to access said slots;

learn at the apparatus, by considering said assignment information, of a slot, of said restricted access window slots, assigned to the apparatus;

learn, at the apparatus, by considering said contention indication, whether contention is to be performed in order to access the slot assigned to the apparatus; and access, at the apparatus, a medium during the slot assigned to the apparatus, wherein said access is in accordance with said contention learning.

In an example embodiment of the invention, the apparatus further comprises wherein the assignment information is received via a beacon frame.

In an example embodiment of the invention, the apparatus further comprises wherein the contention information is received via at least one of a beacon frame and a resource allocation frame.

In an example embodiment of the invention, the apparatus further comprises wherein said contention indication indicates that contention need not be performed in order to access the medium during the slot assigned to the apparatus.

In an example embodiment of the invention, the apparatus further comprises wherein the at least one memory and the computer program code are further configured to, with the at least one processor, cause the apparatus to contend during the slot assigned to the apparatus, wherein said contention indication indicates that contention is to be performed in order to access the medium during the slot assigned to the apparatus.

In an example embodiment of the invention, an apparatus comprises:

at least one processor; and at least one memory including computer program code, the at least one memory and the computer program code configured to, with the at least one processor, cause the apparatus at least to perform:

select, at the apparatus, one or more apparatuses to have contention-free access to a medium;

assign, at the apparatus, association identifiers to said apparatuses;

create, at the apparatus, assignment information, wherein the assignment information conveys for one or more of said apparatuses restricted access window slot assignments, wherein the assignments are specified in terms of said association identifiers, and wherein at least one of said assignments is a single-apparatus-assignment;

set, at the apparatus, contention indication indicating that contention need not be performed in order to access the medium during an assigned slot; and determine to transmit via one or more broadcast frames, from the apparatus, the assignment information and the contention indication.

In an example embodiment of the invention, the apparatus further comprises wherein the assignment information is transmitted via a beacon frame.

In an example embodiment of the invention, the apparatus further comprises wherein the contention information is transmitted via at least one of a beacon frame and a resource allocation frame.

In an example embodiment of the invention, the apparatus further comprises wherein one or more of the selected apparatuses are energy-constrained.

In an example embodiment of the invention, the apparatus further comprises wherein one or more of the selected apparatuses are of high priority.

In an example embodiment of the invention, the apparatus further comprises wherein the at least one memory and the computer program code are further configured to, with the at least one processor, cause the apparatus to set cross slot boundary indication indicating, for said apparatuses selected to have contention-free access, that slot boundary crossing is disallowed.

In an example embodiment of the invention, a method comprises:

receiving, at an apparatus, one or more access node broadcast frames, wherein said broadcast frames comprise;

assignment information on assignment of one or more restricted access window slots, wherein each of said slots is single-apparatus-assigned; and contention indication indicating whether contention is to be performed in order to access said slots;

learning at the apparatus, by considering said assignment information, of a slot, of said restricted access window slots, assigned to the apparatus;

learning, at the apparatus, by considering said contention indication, whether contention is to be performed in order to access the slot assigned to the apparatus; and accessing, at the apparatus, a medium during the slot assigned to the apparatus, wherein said access is in accordance with said contention learning.

In an example embodiment of the invention, a method comprises:

selecting, at an access node, one or more apparatuses to have contention-free access to a medium;

uniquely assigning, at the access node, association identifiers to said apparatuses, wherein each of the association identifiers is assigned to only a single one of said apparatuses;

creating, at the access node, assignment information, wherein the assignment information conveys for one or more of said apparatuses restricted access window slot assignments, wherein the assignments are specified in terms of said association identifiers, and wherein each of said assignments is a single-apparatus-assignment;

setting, at the access node, contention indication indicating that contention need not be performed in order to access the medium during an assigned slot; and determining to transmit via one or more broadcast frames, from the access node, the assignment information and the contention indication.

In an example embodiment of the invention, an apparatus comprises:

at least one processor; and at least one memory including computer program code, the at least one memory and the computer program code configured to, with the at least one processor, cause the apparatus at least to perform:

receive, at the apparatus, one or more access node broadcast frames, wherein said broadcast frames comprise:

assignment information on assignment of one or more restricted access window slots, wherein each of said slots is single-apparatus-assigned; and contention indication indicating whether contention is to be performed in order to access said slots;

learn at the apparatus, by considering said assignment information, of a slot, of said restricted access window slots, assigned to the apparatus;

learn, at the apparatus, by considering said contention indication, whether contention is to be performed in order to access the slot assigned to the apparatus; and access, at the apparatus, a medium during the slot assigned to the apparatus, wherein said access is in accordance with said contention learning.

In an example embodiment of the invention, an apparatus comprises:

at least one processor; and at least one memory including computer program code, the at least one memory and the computer program code configured to, with the at least one processor, cause the apparatus at least to perform:

select, at the apparatus, one or more apparatuses to have contention-free access to a medium;

uniquely assign, at the apparatus, association identifiers to said apparatuses, wherein each of the association identifiers is assigned to only a single one of said apparatuses;

create, at the apparatus, assignment information, wherein the assignment information conveys for one or more of said apparatuses restricted access window slot assignments, wherein the assignments are specified in terms of said association identifiers, and wherein each of said assignments is a single-apparatus-assignment;

set, at the apparatus, contention indication indicating that contention need not be performed in order to access the medium during an assigned slot; and determine to transmit via one or more broadcast frames, from the apparatus, the assignment information and the contention indication.

In this manner, embodiments of the invention provide contention-free medium access within assigned access slots functionality employable, for example, in connection with wireless networks.

DISCUSSION OF EXAMPLE EMBODIMENTS OF THE INVENTION

Figure 1:
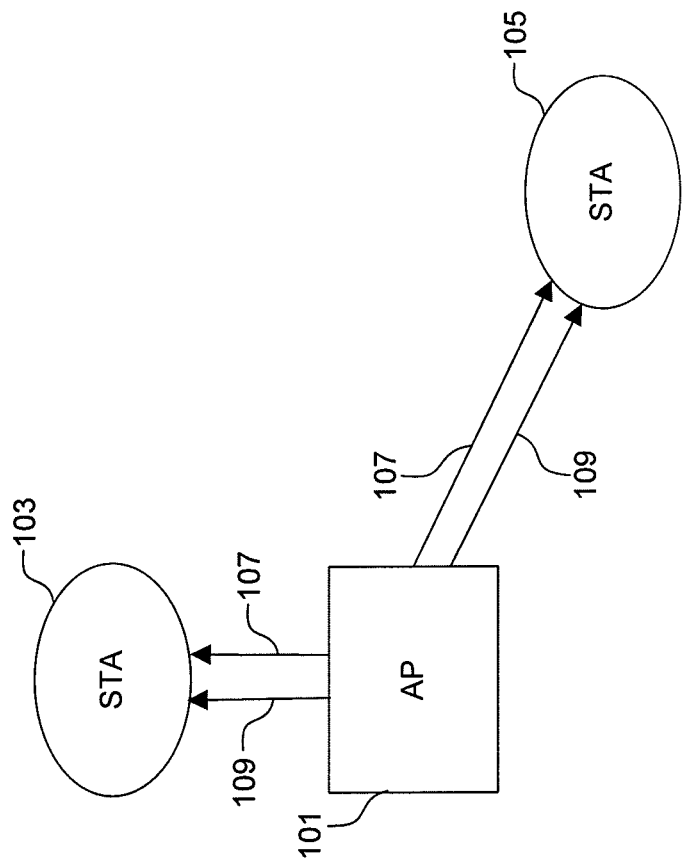
FIG. 1 discloses a deployment scenario for contention-free medium access within assigned access slots functionality in accordance with at least one example embodiment of the present invention.

Contention-Free Medium Access within Assigned Access Slots—General Functionality General contention-free (CF) medium access within Assigned Access Slots functionality according to at least one example embodiment will now be discussed with reference to FIG. 1 which shows a deployment scenario according to at least one example embodiment. Shown in FIG. 1 are access point (AP) 101, traffic information map (TIM) stations (STAs) 103 and 105, and broadcast frames 107 and 109. Dispatched via either or both of broadcast frame 107 and broadcast frame 109 may be one or more discussed-herein CF-RAW sub-fields, discussed-herein slot assignment sub-fields, and/or discussed-herein slot assignment sub-sub-fields. As a non-limiting example, TIM STAs discussed herein which enjoy CF medium access may be energy-constrained STAs (e.g., gas, pressure, and/or other meter and/or sensor STAs, and/or STAs having button cell batteries and/or other limited-capacity power sources). As another non-limiting example, TIM STAs discussed herein which enjoy CF medium access may be alternately or additionally STAs capable of switching between TIM and non-TIM operation (e.g., in view power and/or network circumstances). As yet another non-limiting example, TIM STAs discussed herein which enjoy CF medium access may alternately or additionally be of a high access category or otherwise of high priority. The Institute of Electrical and Electronics Engineers 802.11ah task group is specifying a sensor network to which at least some embodiments discussed herein may be applied.

Also according to the illustrative example, the broadcast frames discussed herein each may contain one or more information elements (IEs). The broadcast frames discussed herein may be beacon frames, resource allocation frames, and/or other types of frames. The IEs discussed herein may be RAW parameter set (RPS) IEs and/or other IEs.

Figure 2A:
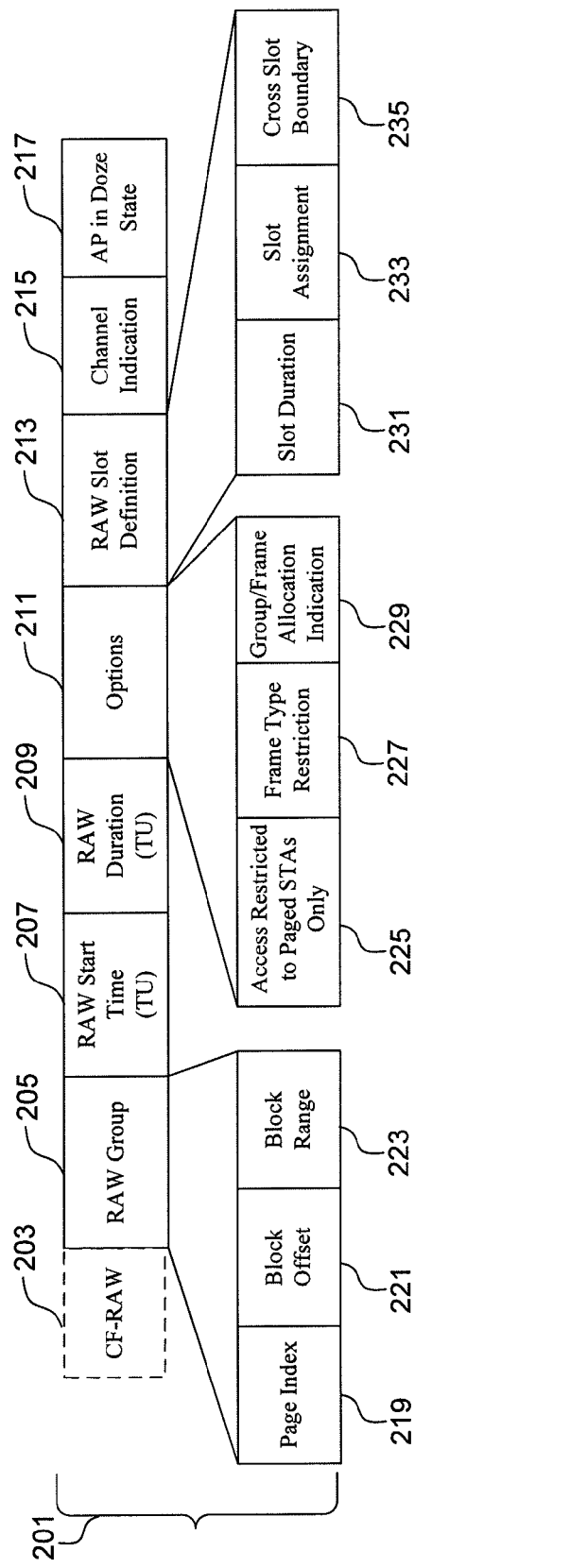
FIG. 2A discloses a first example information element (IE) in accordance with at least one example embodiment of the present invention.

Further according to the illustrative example, FIG. 2A shows a first example IE, an RPS IE according to at least one example embodiment. Included in RPS IE 201 are CF-RAW sub-field 203, RAW Group sub-field 205, RAW Start Time (specified in Time Units (TU)) sub-field 207, RAW Duration sub-field 209 (specified in TU), Options sub-field 211, RAW Slot Definition sub-field 213, Channel Indication sub-field 215, and AP in Doze State sub-field 217. Sub-field 203 is one bit in length, sub-field 205 is a variable number of bits in length, sub-field 207 is eight bits in length, sub-field 209 is a variable number of bits in length, sub-field 211 is three bits in length, sub-field 213 is a variable number of bits in length, sub-field 215 is a variable number of bits in length, and sub-field 217 is a variable number of bits in length. According to at least one example embodiment, RPS IE 201 is an IEEE 802.11ah RPS IE augmented to include CF-RAW sub-field 203.

Still further according to the illustrative example, sub-field 205 includes Page Index sub-sub-field 219, Block Offset sub-sub-field 221, and Block Range sub-sub-field 223. Sub-field 211 includes Access Restricted to Paged STAs Only sub-sub-field 225, Frame Type Restriction sub-sub-field 227, and Group/Frame Allocation Indication sub-sub-field 229. Sub-field 213 includes Slot Duration sub-sub-field 231, Slot Assignment sub-sub-field 233, and Cross Slot Boundary sub-sub-field 235. Sub-sub-field 219 is two bits in length, sub-sub-field 221 is five bits in length, sub-sub-field 223 is a variable number of bits in length, sub-sub-field 225 is one bit in length, sub-sub-field 227 is one bit in length, sub-sub-field 229 is one bit in length, sub-sub-field 231 is a variable number of bits in length, sub-sub-field 233 is a variable number of bits in length, and sub-sub-field 235 is a variable number of bits in length.

Figure 2B:
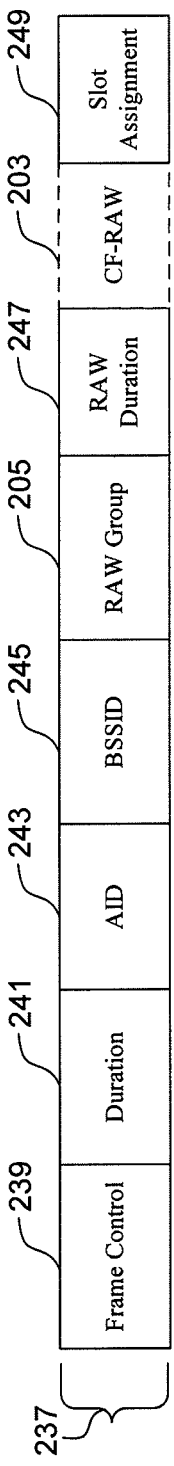
FIG. 2B discloses a second example IE in accordance with at least one example embodiment of the present invention.

Also according to the illustrative example, FIG. 2B shows a second example IE, an IE of a resource allocation frame according to at least one example embodiment. Included in resource allocation frame IE 237 are frame Control sub-field 239, Duration sub-field 241, association identifier (AID) sub-field 243, basic service set identification (BSSID) sub-field 245, RAW group sub-field 205 as noted above in connection with FIG. 2A, RAW Duration sub-field 247, CF-RAW sub-field 203 as noted above in connection with FIG. 2A, and Slot Assignment sub-field 249. Sub-field 239 is sixteen bits in length, sub-field 241 is sixteen bits in length, sub-field 243 is sixteen bits in length, sub-field 245 is 48 bits in length, sub-field 205 is, as previously noted, a variable number of bits in length, sub-field 247 is a variable number of bits in length, sub-field 203 is, as previously noted, one bit in length, and sub-field 249 is a variable number of bits in length. According to at least one example embodiment, resource allocation frame IE 237 is an IEEE 802.11ah resource allocation frame IE augmented to include CF-RAW sub-field 203.

Additionally according to the illustrative example, one or more of the sub-fields and/or sub-sub-fields of FIG. 2A and/or FIG. 2B may be located in one or more other information elements and/or in one or more broadcasted frames. According to at least one example embodiment, the one or more broadcast frames may be beacon frames and/or resource allocation frames. Such a resource allocation frame may be transmitted after such a beacon frame. Beacon frames may be transmitted periodically.

Also according to the illustrative embodiment, as a first non-limiting example, a TIM STA may receive sub-fields and/or sub-sub-fields including a CF-RAW sub-field and a slot assignment sub-sub-field via a beacon frame—or other broadcast frame—by way of an RPS IE or other IE. As a second non-limiting example, a TIM STA may receive sub-fields and/or sub-sub-fields including a CF-RAW sub-field and a slot assignment sub-field via resource allocation frame—or other broadcast frame—by way of an IE. As a third non-limiting example, a TIM STA may receive sub-fields and/or sub-sub-fields including a slot assignment sub-sub-field via beacon frame—or other broadcast frame—by way of an RPS IE or other IE, and a CF-RAW sub-field via resource allocation frame—or other broadcast frame—by way of an IE. As a fourth non-limiting example, a TIM STA may receive sub-fields and/or sub-sub-fields including a CF-RAW sub-field via beacon frame—or other broadcast frame—by way of an RPS IE or other IE, and a slot assignment sub-field via resource allocation frame—or other broadcast frame—by way of an IE.

Also according to the illustrative example, TIM STA 103 and TIM STA 105 each may receive, via either or both of broadcast frame 107 and broadcast frame 109 sub-fields and/or sub-sub-fields including a corresponding CF-RAW sub-field 203 and either or both of a corresponding slot assignment sub-sub-field 233 and a corresponding slot assignment sub-field 249. Such a TIM STA may be able to recognize within a broadcast frame such sub-fields and/or sub-sub-fields corresponding to that STA by virtue of an AID corresponding to that TIM STA being dispatched along with such a sub-field or sub-sub-field.

Additionally according to the illustrative example, the CF-RAW sub-field corresponding to TIM STA 103 may specify (e.g., by virtue of the bit of the sub-field being 1) that contention need not be performed in order to access the slots within a corresponding RAW. TIM STA 103, in accordance with the CF-RAW sub-field specification, may access, during an assigned slot indicated by the slot assignment sub-field and/or the slot assignment sub-sub field corresponding to TIM STA 103, the corresponding medium without performance of contention.

Further according to the illustrative example, the CF-RAW sub-field corresponding to TIM STA 105 may specify (e.g., by virtue of the bit of the sub-field being 0) that contention is to be performed in order to access the slots within a corresponding RAW. TIM STA 105, in accordance with the CF-RAW sub-field specification, may perform, during an assigned slot indicated by the slot assignment sub-field and/or the slot assignment sub-sub field corresponding to TIM STA 105, contention in attempt to access the corresponding medium.

Still further according to the illustrative example, optionally implemented further to RAWs may be one or more Periodic Restricted Access windows (PRAWS) (e.g., IEEE 802.11 ah PRAWS). During such a PRAW a non-TIM STA (e.g., an IEEE 802.11ah non-TIM STA) may awaken at its wakeup time (e.g., a wakeup time received during association) and contends for medium access. Such non-TIM STAs may not need to listen to beacons and, thereby, may potentially experience power saving. Moreover, optionally implementation is such that medium access within times other than RAWs and/or PRAWs may be according to legacy IEEE 802.11 contention.

The implementation of functionality discussed herein yields a number of potential benefits including the following. As one example of a potential benefit, an energy-constrained TIM STA may be able to access an assigned RAW slot without performing contention and, by avoiding such contention, is able to potentially enjoy energy savings. As another example of a potential benefit, a high priority TIM STA may be able to access an assigned RAW slot without performing contention and, by avoiding such contention, is able to access the corresponding medium with less delay.

Contention-Free Medium Access within Assigned Access Slots—Station Functionality Contention-free medium access within assigned access slots station functionality according to at least one example embodiment will now be discussed. As discussed in greater detail herein, via such functionality a STA may receive via one or more broadcast frames conveyance of the STA's slot assignment within a corresponding RAW and also conveyance of indication as to whether or not the STA is to perform contention in order to access the corresponding medium (e.g., the medium established by the AP) within the slot. Where the one or more broadcast frames indicate that medium access calls for contention, the STA, if desirous of accessing the medium, may perform such contention during the assigned slot in attempt to secure medium access. Where the one or more broadcast frames indicate that contention need not be performed in order to achieve medium access, the STA, if desirous of accessing the medium, may access the medium during the assigned slot without performing contention.

Figure 3:
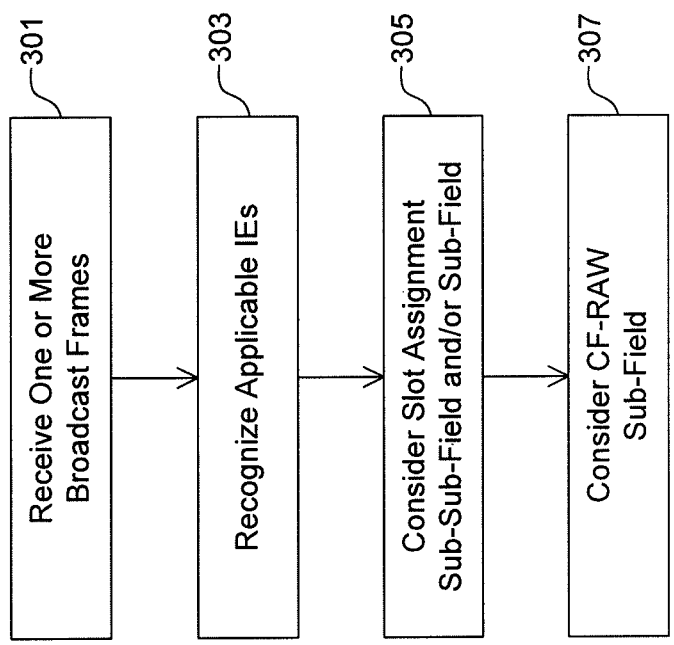
FIG. 3 discloses station (STA) broadcast frame and medium access operations in accordance with at least one example embodiment of the present invention.

As an illustrative example of such functionality, with reference to FIG. 3 which shows STA broadcast frame and medium access operations according to at least one example embodiment, the STA may receive from the AP one or more broadcast frames (301). The STA may examine, in view of its AID (e.g., with the AID having been received by the STA from the AP during association with the AP), IEs contained within the one or more broadcast frames in order to recognize the IEs which apply to that STA (303). Having so recognized an IE, the STA may consider the sub-fields and sub-sub-fields thereof.

Further according to the illustrative example, the STA may consider, in view of its AID, the Slot Assignment sub-sub-field and/or Slot Assignment sub-field received via the one or more broadcast frames (305). A Slot Assignment sub-sub-field—and likewise a Slot Assignment sub-field—may indicate the slot, of a corresponding RAW, assigned to each of one or more indicated AIDs. As such, by such consideration the STA may learn of its assigned slot within the relevant RAW.

Still further according to the illustrative example, the STA may consider the CF-RAW sub-field received via the one or more broadcast frames (307). The CF-RAW sub-field may indicate whether STA contention is to be performed in order to access corresponding RAW slots. As a non-limiting example, the CF-RAW sub-field may hold a bit value of 0 to indicate that contention is to be performed and may hold a bit value of 1 to indicate that contention need not be performed. As another non-limiting example, the CF-RAW sub-field may hold a bit value of 1 to indicate that contention is to be performed and may hold a bit value of 0 to indicate that contention need not be performed. As such, considering the CF-RAW sub-field the STA may learn whether or not it needs to employ contention in order to access the slot.

Also according to the illustrative example, the STA, in the case where a cross slot boundary sub-field is received via the one or more broadcast frames, may consider that Cross Slot Boundary sub-sub-field. The Cross Slot Boundary sub-sub-field may indicate for each of corresponding RAW slots whether or not a STA to whom that slot is assigned is permitted to access the medium within one or more slots subsequent to the assigned slot. As a non-limiting example, the Cross Slot Boundary sub-sub-field may hold a bit value if 1 to indicate that such slot boundary crossing is allowed and may hold a bit value of 0 to indicate that such boundary crossing is not allowed. As another non-limiting example, the Cross Slot Boundary sub-sub-field may hold with respect to a given RAW slot a bit value of 0 to indicate that such boundary crossing is allowed and may hold a bit value of 1 to indicate that such boundary crossing is not allowed. As such, consideration of the Cross Slot Boundary sub-sub-field—if present—may allow the STA to learn whether or not it is permitted to so access the medium within one or more subsequent slots.

Additionally according to the illustrative example, where the STA is desirous of accessing the medium and the CF RAW sub-field indicates that contention need not be performed, the STA may access the medium during its assigned RAW slot without performing contention (e.g., with the STA awakening at its assigned RAW slot). Where the STA is desirous of accessing the medium and the CF RAW sub-field indicates that medium access calls for contention, the STA may perform contention during its assigned slot in attempt to secure medium access (e.g., with the STA awakening at its assigned slot). As a non-limiting example, the STA may so perform such contention by contending at the beginning of its assigned RAW slot.

Further according to the illustrative example, in performing such contention the STA, as a non-limiting example, may execute a back-off method (e.g., a carrier sense multiple access with collision avoidance (CSMA-CA) back-off method) in which the STA may initiate contention by, after the distributed inter-frame space (DIFS) period, invoking a back-off counter value (e.g., a random number between 0 and a minimum contention window (CW_(min)). Once the counter value decrements to 0, the STA may gain access to the medium. Such functionality in one aspect may serve to avoid collisions between two STAs contending for the medium simultaneously. As a non-limiting example, where the STA is desirous of accessing the medium and the CF RAW sub-field indicates that medium access calls for contention, the STA may contend at the beginning of its assigned RAW slot, with the STA performing the contention via execution of a back-off method.

Still further according to the illustrative example, where, for instance, network deployment supports quality of service (QoS), STA priorities, and/or access classes (ACs), in performing such contention the STA, as a non-limiting example, may act in a manner analogous to that discussed above with respect to DIFS, but may employ an arbitration inter-frame space (AIFS) period in place of the noted DIFS period, the AIFS period employed possibly depending on STA priority. Such functionality may, for instance, be performed in connection with enhanced distributed channel access (EDCA).

Also according to the illustrative example, where a Cross Slot Boundary sub-sub-field is received, and where that Cross Slot Boundary sub-sub-field indicates that, with respect to the STA's assigned RAW slot, the STA is not permitted to access the medium within one or more slots subsequent to the STA's assigned slot, regardless of whether the CF-RAW sub-field indicates that contention is to be performed or indicates that contention need not be performed, the STA may terminate medium access with the end of its assigned RAW time slot.

Additionally according to the illustrative example, where a Cross Slot Boundary sub-sub-field is received, and where that Cross Slot Boundary sub-sub-field indicates that, with respect to the STA's assigned RAW slot, the STA is permitted to access the medium within one or more slots subsequent to the STA's assigned slot, and where the CF-RAW sub-field indicates that contention is to be performed, the STA, if desirous of continuing medium access subsequent to the ending of its assigned RAW time slot, may access the medium within one or more slots subsequent to its assigned time slot. The STA, according to at least one example embodiment, may perform contention in connection with endeavoring medium access with regard to such one or more subsequent time slots. According to at least another example embodiment, such contention is may not be performed (e.g., where implementation is from the vantage point that any collision potentially arising from such non-performance of contention is acceptable).

Further according to the illustrative example, where a Cross Slot Boundary sub-sub-field is received, and where that Cross Slot Boundary sub-sub-field indicates that, with respect to the STA's assigned RAW slot, the STA is permitted to access the medium within one or more time slots subsequent to the STA's assigned slot, and where the CF-RAW sub-field indicates that contention need not be performed, the STA, according to at least one example embodiment, may act as if the Cross Slot Boundary sub-sub-field had instead indicated that the STA is not allowed to so access the medium in one or more subsequent time slots. According to at least another example embodiment, the STA, if desirous of continuing medium access subsequent to the ending of its assigned RAW time slot, may perform contention in connection with endeavoring medium access with regard to such one or more subsequent time slots.

Still further according to the illustrative example, as a modification of the above-discussed functionality where the STA is desirous of accessing the medium and the CF-RAW sub-field is set consistent with conveyance that contention need not be performed (e.g., a bit value setting of 1), in the case where the STA knows its AID to be uniquely assigned, it may interpret such CF-RAW sub-field setting as indicating that contention need not be performed. In the case where the STA knows its AID to not be uniquely assigned, it may interpret the CF-RAW sub-field setting as indicating that contention is to be performed. Where the STA does not know whether or not its AID is uniquely assigned, the STA may act as if it knew its AID to not be uniquely assigned. As a non-limiting example, the STA may know, from communication received from the AP during association and/or at another point in time, whether or not its AID is shared.

Contention-Free Medium Access within Assigned Access Slots—Access Point Functionality Contention-free medium access within assigned access slots access point functionality according to at least one example embodiment will now be discussed. As discussed in greater detail herein, via such functionality an AP may formulate, for dispatch via one or more broadcast frames, IEs which provide for CF medium access by STAs, and/or may formulate, for dispatch via one or more broadcast frames, IEs which provide for contention-based medium access by STAs.

Figure 4:
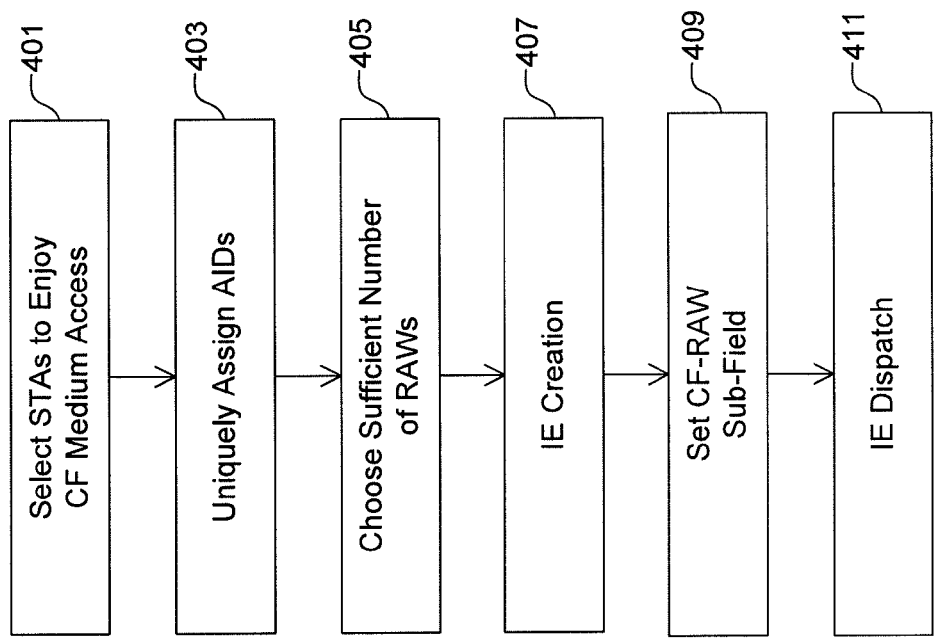
FIG. 4 discloses access point (AP) IE and broadcast frame dispatch operations in accordance with at least one example embodiment of the present invention.

As an illustrative example of such functionality, with reference to FIG. 4, which shows AP IE and broadcast frame dispatch operations according to at least one example embodiment, the AP may select STAs which are to enjoy CF medium access (401) (e.g., STAs which are energy constrained, and/or of a high access category or otherwise of high priority) and may uniquely assign to them AIDs (403) such that the AP does not assign such an AID to another STA. As a non-limiting illustrative example, where the AP so assigns an AID of a particular value (e.g., 12) to a STA, the AP might not assign that particular value to any other STA. According to at least one example embodiment, the AP may learn during association of those STAs which are energy constrained and/or of high priority, and/or may so uniquely assigns AIDs to those STAs during association. According to at least another example embodiment the AP may perform such learning and/or such assignment at a time other than association. Such unique AID assignment, by having an AID map to a single STA, may serve in one aspect to have a slot assignment indicating such an AID assign that slot to a single STA.

Further according to the illustrative example, the AP may choose a sufficient number of RAWs such that the total number of RAW slots amongst the chosen RAWs is such that there is one slot for each STA which is to enjoy CF medium access (405).

Also according to the illustrative example, the AP may perform IE creation (407). More specifically, the AP may create one or more IEs for each such chosen RAW. As a first non-limiting example, the AP may create, for each such chosen RAW, an IE (e.g., an RPS IE) for beacon frame dispatch. As a second non-limiting example, the AP may create an IE for resource allocation frame dispatch. As a third non-limiting example, the AP may create both an IE for beacon frame dispatch and an IE for resource allocation frame dispatch. The IE creation may be such that for each STA which is to enjoy CF medium access there is at least one IE which indicates for that STA's AID, via its Slot Assignment sub-sub field or slot assignment sub-field, an assigned RAW slot. As such, there may one or more RAW slots, each assigned to a single STA. The IE creation may further be such that there is, for each STA which is to enjoy CF medium access, at least one IE having a CF-RAW sub-field which is set to convey that contention need not be performed in order to access the medium (e.g., the CF-RAW sub-field is set to hold a bit value of 1) (409).

Still further according to the illustrative example, where the CF RAW sub-field so indicates that contention need not be performed, according to at least one example embodiment the IE creation may be additionally such that at least one Cross Slot Boundary sub-sub-field is set to indicate, for all corresponding RAW slots, that slot boundary crossing is disallowed. According to at least another example embodiment, where the CF RAW sub-field so indicates that contention need not be performed, the IE creation may be additionally such that at least one Cross Slot Boundary sub-sub-field is set to indicate—for between zero and a plurality of corresponding slots—that slot boundary crossing is allowed, the Cross Slot Boundary sub-sub-field perhaps being set to indicate, for the balance of the slots if any, that slot boundary crossing is disallowed.

Also according to the illustrative example, as noted a STA receiving indication that it need not employ contention in order to access the medium during its assigned slot and further receiving indication that it is permitted to cross from its assigned slot into one or more subsequent slots according to at least one example embodiment may perform contention in connection with attempting to access the medium during those subsequent slots. On one hand such crossing may be, for instance, perceivable as increasing collisions. On the other hand, allowing for such boundary crossing may potentially provide benefits of making slot underuse less likely and/or allowing STAs to enjoy the potential increased medium access afforded by the possibility of the use of slots other than those assigned to those STAs. As such, the decision to allow or not allow slot boundary crossings may endeavor to balance such potential benefits and such potential detriments.

Additionally according to the illustrative example, the AP, having created the one or more IEs, may dispatch them to one or more STAs via one or more broadcast frames (411).

Figure 5:
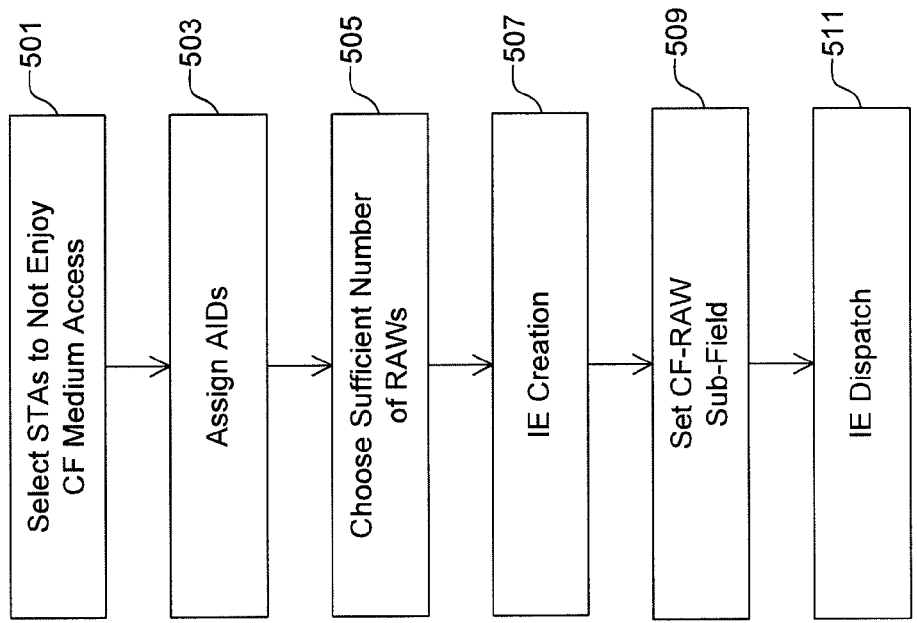
FIG. 5 discloses further AP IE and broadcast frame dispatch operations in accordance with at least one example embodiment of the present invention.

Further according to the illustrative example, with reference to FIG. 5, which shows further AP IE and broadcast frame dispatch operations according to at least one example embodiment, the AP may select STAs which are not to enjoy CF medium access (501) and assign to them AIDs (503), with the assignment not needing to be unique. As a non-limiting example, the AP may select as those STAs which are not to enjoy CF medium access STAs which are either or both of non-energy constrained and non-high priority. According to at least one example embodiment the AP may learn during association of such STAs, and/or may assign during association to such STAs AIDs, with the assignment not needing to be unique. AID assignment to such a non-energy constrained and/or non-high priority STA not being unique may yield potential benefits including decreasing slot underuse. Such not-necessarily-unique AID assignment, by allowing an AID to map to more than a single STA, may serve in one aspect to allow a slot assignment indicating such an AID to assign that slot to multiple STAs.

Still further according to the illustrative example, the AP may choose a sufficient number of RAWs such that the total number of RAW slots amongst the chosen number of RAWs is such that, bearing in mind the extent to which various AIDs are multiply assigned, there is a—perhaps shared—RAW slot for each STA which is not to enjoy CF medium access (505). The AP then may perform IE creation (507). More specifically, the AP may create one or more IEs for each such chosen RAW. As a first non-limiting example, the AP may create, for each such chosen RAW, an IE (e.g., an RPS IE) for beacon frame dispatch. As a second non-limiting example, the AP may create an IE for resource allocation frame dispatch. As a third non-limiting example, the AP may create both an IE for beacon frame dispatch and an IE for resource allocation frame dispatch. The IE creation may be such that for each STA which is not to enjoy CF medium access there is at least one IE which indicates for that STA's AID, via its Slot Assignment sub-sub-field or Slot Assignment sub-field, a—perhaps shared—assigned RAW slot. The IE creation may be further such that there is, for each STA which is not to enjoy CF medium access, at least one IE having a CF-RAW sub-field which is set to convey that contention is to be performed in order to access the medium (e.g., the CF-RAW sub-field is set to hold a bit value of 0) (509).

Also according to the illustrative example, the IE creation may be such that at least one Cross Slot Boundary sub-sub-field is set to indicate—for between zero and a plurality of corresponding slots—that slot boundary crossing is allowed, the Cross Slot Boundary sub-sub-field perhaps being set to indicate, for the balance of the slots if any, that slot boundary crossing is disallowed.

Additionally according to the illustrative example, boundary crossing might on one hand be perceived as increasing collisions. On the other hand, allowing for such boundary crossing may potentially provide benefits of making slot underuse less likely and/or allowing STAs to enjoy the potential increased medium access afforded by the possibility of the use of slots other than those assigned to those STAs. As such, the decision to allow or not allow slot boundary crossing may endeavor to balance such potential benefits and such potential determents.

Further according to the illustrative example, the AP, having created the one or more IEs, may dispatch them to one or more STAs via one or more broadcast frames (511).

Still further according to the illustrative example, a resource allocation frame may be capable of scheduling one or more multi-user multiple-input/multiple-output (MU-MIMO) groups. Where the AP opts to select as an employed broadcast frame—either alone or along with other types of broadcast frames—a resource allocation frame, the resource allocation frame may synchronize corresponding STAs for upload. As such, MU-MIMO uplink transmissions may be provided for.

Also according to the illustrative example, as a modification of the above-discussed functionality the AP may act to create an IE (e.g., an IE for beacon frame dispatch or an IE for allocation frame dispatch) or an IE pair (e.g., an IE for beacon frame dispatch and an IE for allocation frame dispatch) where the IE or IE pair may be capable of corresponding both to STAs chosen by the AP to enjoy CF medium access and STAs chosen by the AP to not enjoy CF medium access.

Additionally according to the illustrative example, within the IE or IE pair, for those STAs chosen by the AP to enjoy CF medium access, slot assignments by the AP may be single STA assignments indicating AIDs which are uniquely assigned by the AP. Further within the IE or IE pair, for STAs chosen by the AP to not enjoy CF medium access, the AP may assign slots such that a given slot assignment may be shared amongst multiple STAs sharing the same AP-assigned AID.

Further according to the illustrative example, for the IE or IE pair the CF-RAW sub-field may be set by the AP in the manner consistent with conveyance that contention need not be performed (e.g., a bit value setting of 1).

Still further according to the illustrative example, a STA receiving the IE or IE pair may receive both slot assignment, and also the CF-RAW sub-field setting consistent with conveyance that contention need not be performed (e.g., a bit value setting of 1). As noted, in the case where the STA knows its AID to be uniquely assigned, it may interpret the CF-RAW sub-field setting as indicating that contention need not be performed. In the case where the STA knows its AID to not be uniquely assigned, it may interpret the CF-RAW sub-field setting as indicating that contention is to be performed. Where the STA does not know whether or not its AID is uniquely assigned, the STA may act as if it knew its AID to not be uniquely assigned. As a non-limiting example, the STA may know, from communication received from the AP during association and/or at another point in time, whether or not its AID is shared.

Hardware and Software

The foregoing discusses computers, such as the discussed AP and STA devices, performing a number of operations. Examples of computers include smart cards, media devices, personal computers, engineering workstations, PCs, PDAs, portable computers, computerized watches, wired and wireless terminals, telephones, communication devices, nodes, servers, network access points, network multicast points, network devices, network stations, set-top boxes, personal video recorders (PVRs), game consoles, portable game devices, portable audio devices, portable media devices, portable video devices, televisions, digital cameras, digital camcorders, Global Positioning System (GPS) receivers, sensors, and wireless personal servers.

Running on such computers may be one or more operating systems. Examples of operating systems include Windows Phone (e.g., Windows Phone 8 or Windows Phone 7), Windows (e.g., Windows 8, Windows 7, or Windows Vista), Windows Server (e.g., Windows Server 2012, Windows server 2008, or Windows Server 2003), Maemo, Symbian OS, WebOS, Linux, OS X, and iOS. Supported by such computers may optionally be one or more of the S60 Platform, the .NET Framework, Java, and Cocoa.

Examples of computers also include one or more processors operatively connected to one or more memory or storage units, wherein the memory or storage optionally contains data, algorithms, and/or program code, and the processor or processors execute the program code and/or manipulate the program code, data, and/or algorithms.

Figure 6:
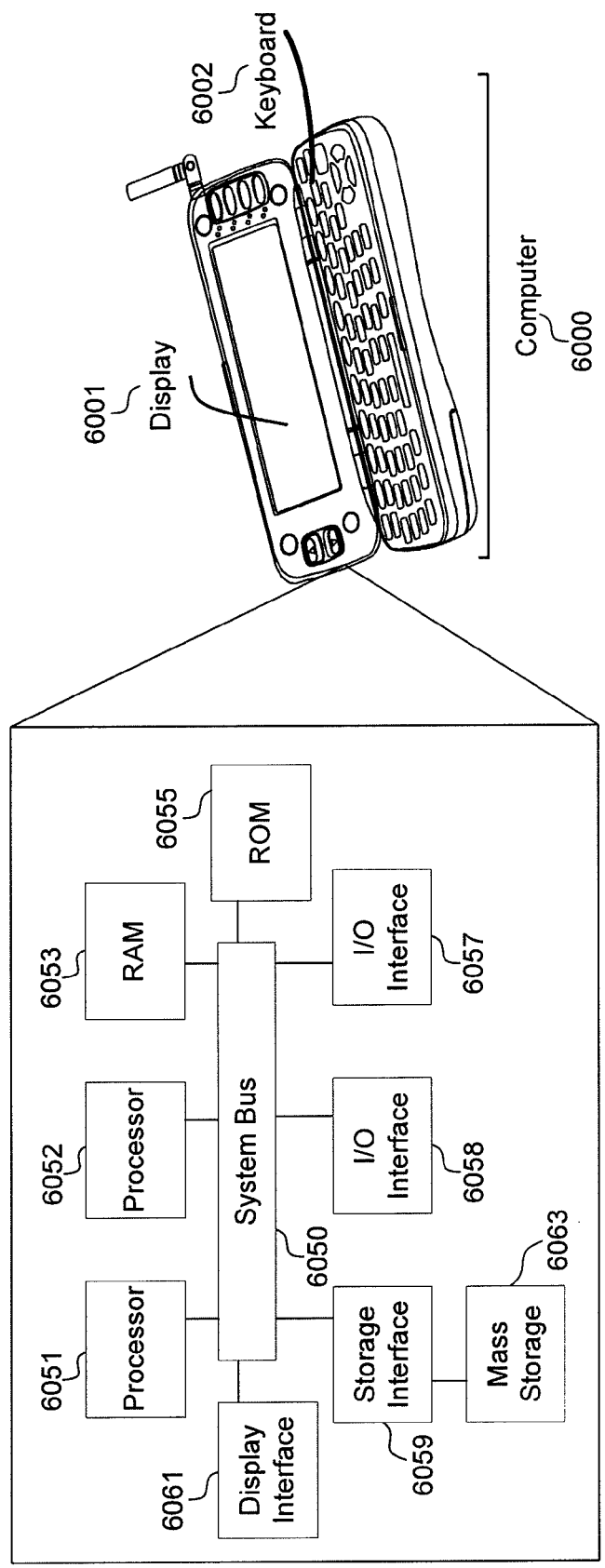
FIG. 6 discloses a computer in accordance with at least one example embodiment of the present invention.

FIG. 6 shows example computer 6000 including system bus 6050 which operatively connects two processors 6051 and 6052, random access memory 6053, read-only memory 6055, input output (I/O) interfaces 6057 and 6058, storage interface 6059, and display interface 6061. Storage interface 6059 in turn connects to mass storage 6063. Each of I/O interfaces 6057 and 6058 is an Ethernet, IEEE 1394, IEEE 1394b, IEEE 802.11a, 802.11af, 802.11ah, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16m, IEEE 802.16x, IEEE 802.20, IEEE 802.22, IEEE 802.15.3, ZigBee (e.g., IEEE 802.15.4), Bluetooth (e.g., IEEE 802.15.1), Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), MediaFLO (Forward Link Only), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Long Term Evolution (LTE), Global System for Mobile Communications (GSM), Code Division Multiple Access 2000 (CDMA2000), DVB-H (Digital Video Broadcasting: Handhelds), HDMI (High-Definition Multimedia Interface), Thunderbolt, or IrDA (Infrared Data Association) interface.

Further according to FIG. 6 mass storage 6063 may be a hard drive or flash memory. Each of processors 6051 and 6052 may be an ARM-based processor or an x86-based processor. Computer 6000 as shown in this example also includes a touch screen 6001 and physical keyboard 6002. Optionally a mouse or keypad may alternately or additionally be employed. Moreover, one or more of touch screen 6001 and physical keyboard 6002 may optionally be eliminated.

Additionally according to FIG. 6 computer 6000 optionally includes or is attached to one or more image capture devices. Examples of image capture devices include ones employing Complementary Metal Oxide Semiconductor (CMOS) hardware and ones employing Charge Coupled Device (CCD) hardware. One or more of the image capture devices may according to one example of an implementation be aimed towards the user. Alternately or additionally, one or more of the image capture devices may be aimed away from the user. The one or more image capture devices may be optionally employed by computer 6000 for video conferencing, still image capture, and/or video capture. Moreover, computer 6000 may optionally include or be attached to one or more card readers, DVD drives, floppy disk drives, hard drives, memory cards, or ROM devices whereby media containing program code—such as program code for performing the discussed operations—is optionally inserted for the purpose of loading the code onto the computer. Further, program code—such as program code for performing the discussed operations—may be optionally loaded the code onto the computer via one or more of I/O interfaces 6057 and 6058, perhaps using one or more networks.

According to an example of an implementation, executed by computers discussed herein may be one or more software modules designed to perform one or more of the discussed operations. Such modules are programmed using one or more languages. Examples of languages include C#, C, C++, Objective C, Java, Perl, and Python. Corresponding program code is optionally placed on media. Examples of media include DVD, CD-ROM, memory card, and floppy disk.

Any indicated division of operations among particular software modules is for purposes of illustration, and alternate divisions of operation are possible. Accordingly, any operations indicated to be performed by one software module may be according to an alternative implementation instead performed by a plurality of software modules. Similarly, any operations indicated to be performed by a plurality of modules may be according to an alternative implementation instead be performed by a single module.

Further, any operations indicated to be performed by a particular computer such as a particular device may be according to an alternative implementation instead performed by a plurality of computers such as by a plurality of devices. Moreover, peer-to-peer, cloud, and/or grid computing techniques may be optionally employed. Additionally, implementations may include remote communication among software modules. Examples of remote communication techniques include Simple Object Access Protocol (SOAP), Java Messaging Service (JMS), Remote Method Invocation (RMI), Remote Procedure Call (RPC), sockets, and pipes.

Optionally, operations discussed herein may be implemented via hardware. Examples of such implementation via hardware include the use of one or more of integrated circuits, specialized hardware, chips, chipsets, Application-Specific Integrated Circuits (ASICs), and Field-Programmable Gate Arrays (FPGAs). As a non-limiting example such hardware may be programmed to perform operations discussed herein using one or more languages such as one or more Hardware Description Languages (HDLs). Examples of HDLs include very-high-speed integrated circuit hardware description language (VDHL) and Verilog.

Figure 7A:
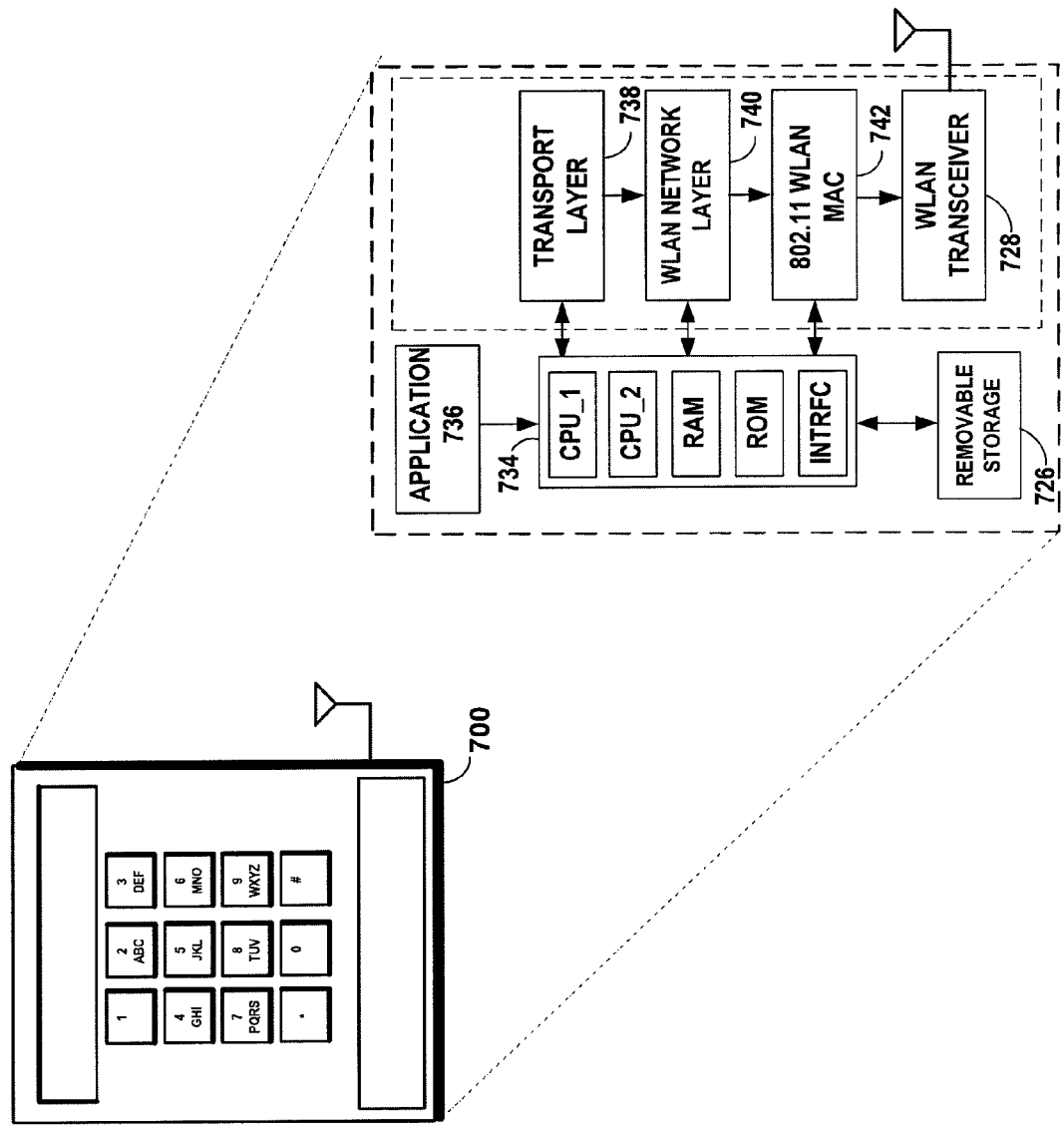
FIG. 7A discloses a functional block diagram in accordance with at least one example embodiment of the present invention.

FIG. 7A is an example functional block diagram, illustrating an example AP or STA device 700 according to an example embodiment of the invention. The example device 700 includes a processor 734 that includes dual or multi-core central processing units CPU_1 and CPU_2, a RAM memory, a ROM memory, and an interface for a keypad, display, and other input/output devices. The example device 700 includes a protocol stack, including the transceiver 728 and IEEE 802.11 ah MAC 742. The protocol stack includes a network layer 740, a transport layer 738, and an application program 736.

In an example embodiment, the interface circuits in FIG. 7A may interface with one or more radio transceivers, battery and other power sources, key pad, touch screen, display, microphone, speakers, ear pieces, camera or other imaging devices, etc. The RAM and ROM may optionally be removable memory devices 726 such as smart cards, subscriber identity modules (SIMs), wireless identification modules (WIMs), semiconductor memories such as RAM, ROM, PROMS, flash memory devices, etc. The processor protocol stack layers, and/or application program are according to an example of an implementation embodied as program logic stored in the RAM and/or ROM in the form of sequences of programmed instructions which, when executed in the CPU, carry out the functions of example embodiments. The program logic is according to an example of an implementation delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed ASICs. The one or more radios in the device may be separate transceiver circuits or alternately, the one or more radios may be a single RF module capable of handling one or multiple channels in a high speed, time and frequency multiplexed manner in response to the processor. Examples of removable storage media 726 include those based on magnetic, electronic, and/or optical technologies, such as magnetic disks, optical disks, semiconductor memory circuit devices, and micro-SD memory cards (SD refers to the Secure Digital standard) for storing data and/or computer program code as an example computer program product, in accordance with at least one embodiment of the present invention.

Figure 7B:
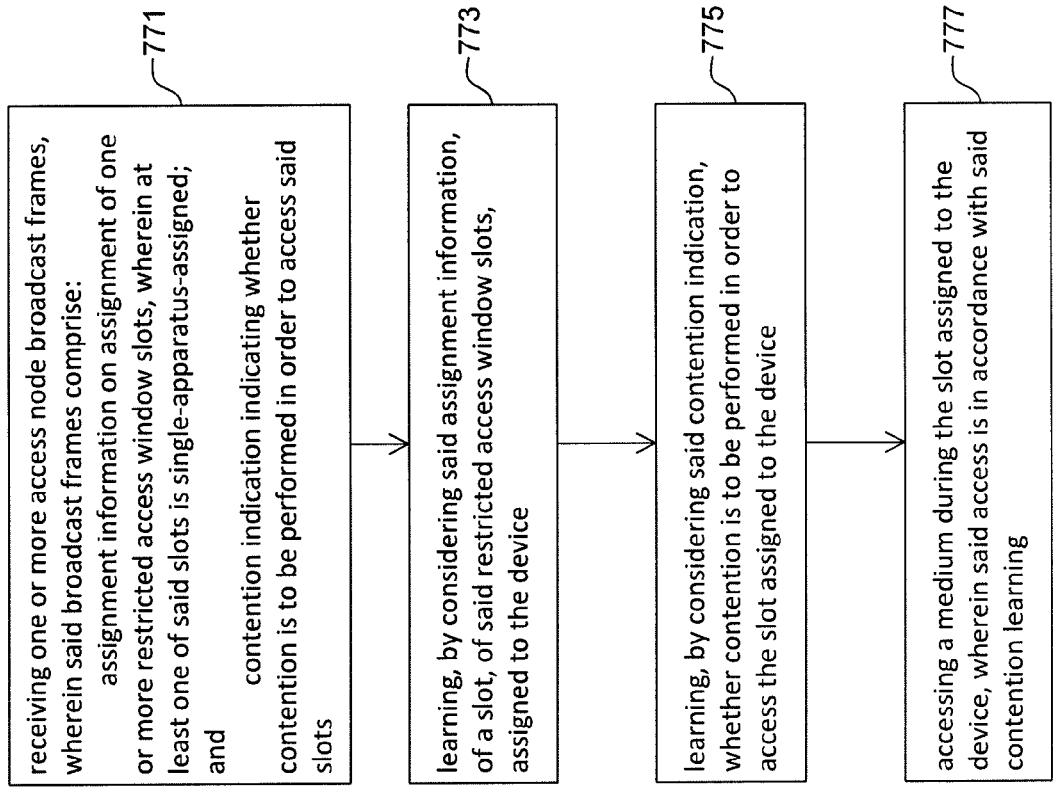
FIG. 7B discloses a flow diagram in accordance with at least one example embodiment of the present invention.

In an example embodiment of the invention, the device 700 of FIG. 7A is a device, comprising:
at least one processor 734;
at least one memory, RAM, ROM, and/or removable storage 726 including computer program code represented by the flow diagram of FIG. 7B;
the at least one memory and the computer program code configured to, with the at least one processor, cause the device 700 at least to:
receive one or more access node broadcast frames, wherein said broadcast frames comprise: assignment information on assignment of one or more restricted access window slots, wherein at least one of said slots is single-apparatus-assigned; and contention indication indicating whether contention is to be performed in order to access said slots;

learn, by considering said assignment information, of a slot, of said restricted access window slots, assigned to the device;

learn by considering said contention indication, whether contention is to be performed in order to access the slot assigned to the device; and access a medium during the slot assigned to the device, wherein said access is in accordance with said contention learning.

FIG. 7B discloses a flow diagram in accordance with at least one example embodiment of the present invention. 771, 773, 775, and 777 of FIG. 7B as a non-limiting example represent computer code instructions stored in the RAM and/or ROM memory of device 700, which when executed by the central processing units (CPU), carry out the functions of an example embodiment of the invention. 771, 773, 775, and 777 are performable in another order than shown and are combinable and/or separable into component operations. As such:

771: receiving one or more access node broadcast frames, wherein said broadcast frames comprise: assignment information on assignment of one or more restricted access window slots, wherein at least one of said slots is single-apparatus-assigned; and contention indication indicating whether contention is to be performed in order to access said slots;

773: learning, by considering said assignment information, of a slot, of said restricted access window slots, assigned to the device;

775: learning, by considering said contention indication, whether contention is to be performed in order to access the slot assigned to the device; and

777: accessing a medium during the slot assigned to the device, wherein said access is in accordance with said contention learning.

Figure 7C:
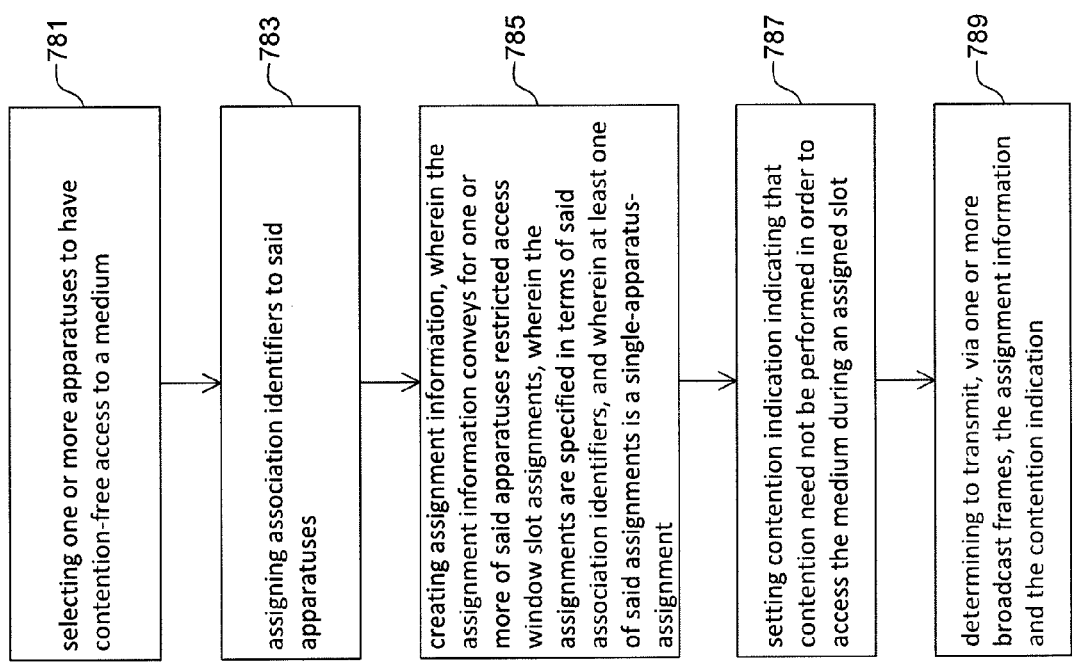
FIG. 7C discloses a further flow diagram in accordance with at least one example embodiment of the present invention.

In a further example embodiment of the invention, the device 700 of FIG. 7A is a device, comprising:

at least one processor 734;

at least one memory, RAM, ROM, and/or removable storage 726 including computer program code represented by the flow diagram of FIG. 7C;

the at least one memory and the computer program code configured to, with the at least one processor, cause the device 700 at least to:

select one or more apparatuses to have contention-free access to a medium;

assign association identifiers to said apparatuses;

create assignment information, wherein the assignment information conveys for one or more of said apparatuses restricted access window slot assignments, wherein the assignments are specified in terms of said association identifiers, and wherein at least one of said assignments is a single-apparatus-assignment;

set contention indication indicating that contention need not be performed in order to access the medium during an assigned slot; and determine to transmit via one or more broadcast frames the assignment information and the contention indication.

FIG. 7C discloses a further flow diagram in accordance with at least one example embodiment of the present invention. 781, 783, 785, 787, and 789 of FIG. 7C as a non-limiting example represent computer code instructions stored in the RAM and/or ROM memory of device 700, which when executed by the central processing units (CPU), carry out the functions of an example embodiment of the invention. 781, 783, 785, 787, and 789 are performable in another order than shown and are combinable and/or separable into component operations. As such:

781: selecting one or more apparatuses to have contention-free access to a medium;

783: assigning association identifiers to said apparatuses;

785: creating assignment information, wherein the assignment information conveys for one or more of said apparatuses restricted access window slot assignments, wherein the assignments are specified in terms of said association identifiers, and wherein at least one of said assignments is a single-apparatus-assignment;

787: setting contention indication indicating that contention need not be performed in order to access the medium during an assigned slot; and

789: determining to transmit, via one or more broadcast frames, the assignment information and the contention indication.

Figure 8:
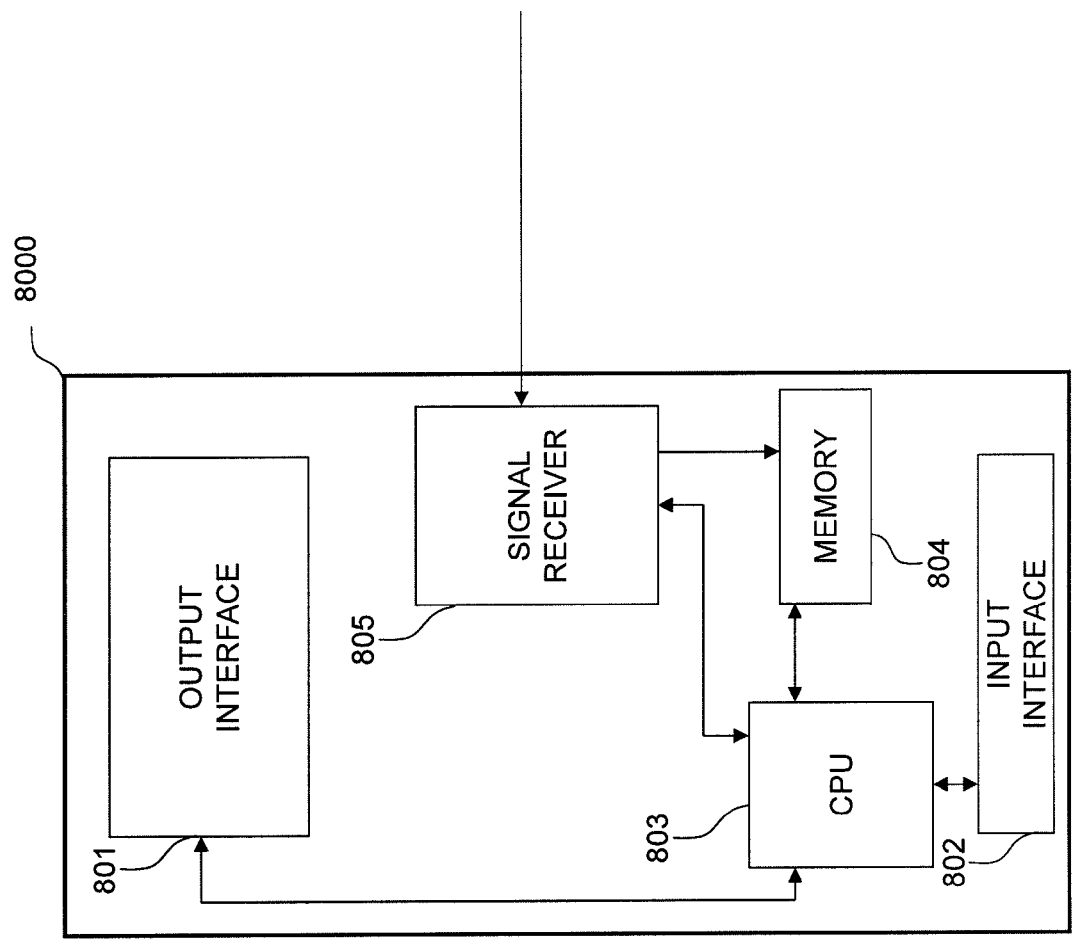
FIG. 8 discloses a further computer in accordance with at least one example embodiment of the present invention.

As noted, the foregoing discusses computers such as the discussed AP and STA devices. Shown in FIG. 8 is a block diagram of a further computer according to at least one example embodiment, terminal 8000. Terminal 8000 of FIG. 8 includes a processing unit CPU 803, a signal receiver 805, and a user interface (801, 802). Examples of signal receiver 805 include single-carrier and multi-carrier receivers. Signal receiver 805 and the user interface (801, 802) are coupled with the processing unit CPU 803. One or more direct memory access (DMA) channels may exist between multi-carrier signal terminal part 805 and memory 804. The user interface (801, 802) may include a display and a keyboard that enable a user to use the terminal 8000. In addition, the user interface (801, 802) may include a microphone and a speaker for receiving and producing audio signals. The user interface (801, 802) may optionally employ voice recognition.

The processing unit CPU 803 may be a microprocessor, may communicate with memory 804, and may optionally communicate with software. The software may be stored in the memory 804. The microprocessor may control, on the basis of the software, the operation of the terminal 8000, such as receiving of a data stream, tolerance of the impulse burst noise in data reception, displaying output in the user interface and the reading of inputs received from the user interface. The hardware may contain circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 8, middleware or software implementation may be optionally applied. Examples of terminal 8000 include a hand-held device such as a cellular mobile phone which includes the multi-carrier signal terminal part 805 for receiving multicast transmission streams. Therefore, the terminal 8000 optionally interacts with service providers.

It is noted that although APs and STAs have been discussed at various junctures in connection with IEEE 802.11 so as to facilitate ease of discussion, the APs and STAs discussed herein are not limited to IEEE 802.11 APs and STAs. Non-limiting examples of APs discussed herein include access points (IEEE 802.11 and/or other than IEEE 802.11), access nodes, base stations, and other devices. Non-limiting examples of STAs discussed herein include stations (IEEE 802.11 and/or other than IEEE 802.11), mobile terminals, and other devices. APs and STAs discussed herein are, as non-limiting examples, of the networking modalities discussed above in connection with input output (I/O) interfaces 6057 and 6058.

Example embodiments of the invention include an apparatus, comprising:

means for receiving one or more access node broadcast frames, wherein said broadcast frames comprise: assignment information on assignment of one or more restricted access window slots, wherein at least one of said slots is single-apparatus-assigned; and contention indication indicating whether contention is to be performed in order to access said slots;

means for learning, by considering said assignment information, of a slot, of said restricted access window slots, assigned to the apparatus;

means for learning, by considering said contention indication, whether contention is to be performed in order to access the slot assigned to the apparatus; and means for accessing a medium during the slot assigned to the apparatus, wherein said access is in accordance with said contention learning.

Example embodiments of the invention further include an apparatus, comprising:

means for selecting one or more apparatuses to have contention-free access to a medium;

means for assigning association identifiers to said apparatuses;

means for creating assignment information, wherein the assignment information conveys for one or more of said apparatuses restricted access window slot assignments, wherein the assignments are specified in terms of said association identifiers, and wherein at least one of said assignments is a single-apparatus-assignment;

means for setting contention indication indicating that contention need not be performed in order to access the medium during an assigned slot; and means for determining to transmit, via one or more broadcast frames, the assignment information and the contention indication.

Example embodiments of the invention include an apparatus, comprising:

means for receiving one or more access node broadcast frames, wherein said broadcast frames comprise: assignment information on assignment of one or more restricted access window slots, wherein each of said slots is single-apparatus-assigned; and contention indication indicating whether contention is to be performed in order to access said slots;

means for learning, by considering said assignment information, of a slot, of said restricted access window slots, assigned to the apparatus;

means for learning, by considering said contention indication, whether contention is to be performed in order to access the slot assigned to the apparatus; and means for accessing a medium during the slot assigned to the apparatus, wherein said access is in accordance with said contention learning.

Example embodiments of the invention further include an apparatus, comprising:

means for selecting one or more apparatuses to have contention-free access to a medium;

means for uniquely assigning association identifiers to said apparatuses, wherein each of the association identifiers is assigned to only a single one of said apparatuses;

means for creating assignment information, wherein the assignment information conveys for one or more of said apparatuses restricted access window slot assignments, wherein the assignments are specified in terms of said association identifiers, and wherein each of said assignments is a single-apparatus-assignment;

means for setting contention indication indicating that contention need not be performed in order to access the medium during an assigned slot; and means for determining to transmit, via one or more broadcast frames, the assignment information and the contention indication.

Ramifications and Scope

Although the description above contains many specifics, these are merely provided to illustrate the invention and should not be construed as limitations of the invention's scope. For instance, various examples are articulated herein via the discussion of certain aspects. Such aspects are, themselves, merely examples and should not be construed as limitations of the invention's scope. Thus it will be apparent to those skilled in the art that various modifications and variations are applicable to the system and processes of the present invention without departing from the spirit or scope of the invention.

In addition, the embodiments, features, methods, systems, and details of the invention that are described above in the application are combinable separately or in any combination to create or describe new embodiments of the invention.

What is claimed is:

1. A method, comprising:
    receiving, at an apparatus, one or more access node broadcast frames, wherein said broadcast frames comprise:
        assignment information on assignment of one or more restricted access window slots, wherein at least one of said slots is single-apparatus-assigned; and
        contention indication indicating whether or not contention is to be performed in a specific at least one of said slots, in order to access said slots;
    learning at the apparatus, by considering said assignment information, of the specific at least one of said slots, of said restricted access window slots, assigned to the apparatus;
    learning, at the apparatus, by considering said contention indication, whether contention is to be performed in order to access the specific at least one of said slots assigned to the apparatus; and
    accessing, at the apparatus, a medium during the specific at least one of said slots assigned to the apparatus, wherein said access is in accordance with said contention learning.

2. The method of claim 1, wherein the assignment information is received via a beacon frame.

3. The method of claim 1, wherein the contention information is received via at least one of a beacon frame and a resource allocation frame.

4. The method of claim 1, wherein said contention indication indicates that contention need not be performed in order to access the medium during the specific at least one of said slots assigned to the apparatus.

5. The method of claim 1, further comprising contending, by the apparatus, during the specific at least one of said slots assigned to the apparatus, wherein said contention indication indicates that contention is to be performed in order to access the medium during the specific at least one of said slots assigned to the apparatus.

6. A method, comprising:
    selecting, at an access node, one or more apparatuses to have contention-free access to a medium;
    assigning, at the access node, association identifiers to said apparatuses;
    creating, at the access node, assignment information, wherein the assignment information conveys for one or more of said apparatuses restricted access window slot assignments, wherein the assignments are specified in terms of said association identifiers, and wherein at least one of said assignments is a single-apparatus-assignment;

setting, at the access node, contention indication indicating whether or not that contention need not be performed in order to access the medium during an assigned specific slot; and determining to transmit via one or more broadcast frames, from the access node, the assignment information and the contention indication.

7. The method of claim 6, wherein the assignment information is transmitted via a beacon frame.

8. The method of claim 6, wherein the contention information is transmitted via at least one of a beacon frame and a resource allocation frame.

9. The method of claim 6, wherein one or more of the selected apparatuses are energy-constrained.

10. The method of claim 6, wherein one or more of the selected apparatuses are of high priority.

11. The method of claim 6, further comprising setting, by the access node, cross slot boundary indication indicating, for said apparatuses selected to have contention-free access, that slot boundary crossing is disallowed.

12. An apparatus, comprising:

at least one processor; and at least one memory including computer program code, the at least one memory and the computer program code configured to, with the at least one processor, cause the apparatus at least to perform:

receive, at the apparatus, one or more access node broadcast frames, wherein said broadcast frames comprise:

assignment information on assignment of one or more restricted access window slots, wherein at least one of said slots is single-apparatus-assigned; and contention indication indicating whether or not contention is to be performed in a specific at least one of said slots, in order to access said slots;

learn at the apparatus, by considering said assignment information, of the specific at least one of said slots, of said restricted access window slots, assigned to the apparatus;

learn, at the apparatus, by considering said contention indication, whether contention is to be performed in order to access the specific at least one of said slots assigned to the apparatus; and access, at the apparatus, a medium during the specific at least one of said slots assigned to the apparatus, wherein said access is in accordance with said contention learning.

13. The apparatus of claim 12, wherein the assignment information is received via a beacon frame.

14. The apparatus of claim 12, wherein the contention information is received via at least one of a beacon frame and a resource allocation frame.

15. The apparatus of claim 12, wherein said contention indication indicates that contention need not be performed in order to access the medium during the specific at least one of said slots assigned to the apparatus.

16. The apparatus of claim 12, wherein the at least one memory and the computer program code are further configured to, with the at least one processor, cause the apparatus to contend during the specific at least one of said slots assigned to the apparatus, wherein said contention indication indicates that contention is to be performed in order to access the medium during the specific at least one of said slots assigned to the apparatus.

17. An apparatus, comprising:

at least one processor; and at least one memory including computer program code, the at least one memory and the computer program code configured to, with the at least one processor, cause the apparatus at least to perform:

select, at the apparatus, one or more apparatuses to have contention-free access to a medium;

assign, at the apparatus, association identifiers to said apparatuses;

create, at the apparatus, assignment information, wherein the assignment information conveys for one or more of said apparatuses restricted access window slot assignments, wherein the assignments are specified in terms of said association identifiers, and wherein at least one of said assignments is a single-apparatus-assignment;

set, at the apparatus, contention indication indicating whether or not that contention need not be performed in order to access the medium during an assigned specific slot; and determine to transmit via one or more broadcast frames, from the apparatus, the assignment information and the contention indication.

18. The apparatus of claim 17, wherein the assignment information is transmitted via a beacon frame.

19. The apparatus of claim 17, wherein the contention information is transmitted via at least one of a beacon frame and a resource allocation frame.

20. The apparatus of claim 17, wherein one or more of the selected apparatuses are energy-constrained.

21. The apparatus of claim 17, wherein one or more of the selected apparatuses are of high priority.

22. The apparatus of claim 17, wherein the at least one memory and the computer program code are further configured to, with the at least one processor, cause the apparatus to set cross slot boundary indication indicating, for said apparatuses selected to have contention-free access, that slot boundary crossing is disallowed.

* * * * *